UNITED STATES PATENT OFFICE.

ERNST FUSSENEGGER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

AZO COLORING-MATTER.

No. 806,077.      Specification of Letters Patent.      Patented Nov. 28, 1905.

Application filed August 4, 1905. Serial No. 272,787.

*To all whom it may concern:*

Be it known that I, ERNST FUSSENEGGER, doctor of philosophy and chemist, a subject of the Emperor of Austria-Hungary, residing at Ludwigshafen-on-the-Rhine, in the Kingdom of Bavaria, German Empire, have invented new and useful Improvements in Azo Coloring-Matters, of which the following is a specification.

My invention relates to the manufacture and production of azo coloring-matters which are particularly suitable for use in the form of their lakes.

In the specification of German Patent No. 117,167 is described the production of 1.3-dihydroxy-quinolin, and I have now discovered that by the action of diazo compounds of the benzene or naphthalene series on this 1.3-dihydroxy-quinolin new azo coloring-matters can be obtained which can be used for dyeing wool, producing from yellow to orange-red shades, and which are also particularly suitable for the preparation of lakes whose shades are also within the range of from yellow to orange-red. The color of the dyes so obtained ranges from a lemon-yellow to orange-red, and those dyes which are obtained from amins which contain no sulfo group and from amins which contain no carboxyl group are insoluble in water, while those dyes which are obtained from an amin-sulfo-acid or from an amin-carboxylic acid can be converted into difficultly soluble or insoluble lakes, according to the well-known methods of preparing such lakes.

My new coloring-matters on being reduced with tin and hydrochloric acid give rise to amido-dihydroxy-quinolin, which has the power of reducing ammoniacal-silver solution in the cold and which in the form of its hydrochloric-acid salt crytallizes from alcohol in fine colorless needles.

The following examples illustrate how some of the new coloring-matters can be obtained according to my invention, which, however, is not confined to these examples. The parts are by weight.

Example 1: Diazotize ninety-three (93) parts of anilin in the usual manner and allow the solution to run at ordinary temperature into a solution of two hundred and five (205) parts of the disodium salt of 1.3-dihydroxy-quinolin in three thousand (3,000) parts of water, to which also sufficient sodium carbonate has been added to maintain the whole alkaline, stir for half an hour, (30 minutes,) filter off the yellow coloring-matter, wash with water, and grind to a homogeneous paste.

Example 2: Diazotize three hundred and seventeen (317) parts of crystallized sodium naphthionate in the usual manner and allow the solution to run at ordinary temperature into a solution of two hundred and five (205) parts of the disodium salt of 1.3-dihydroxy-quinolin, to which also sufficient sodium carbonate has been added to maintain the whole alkaline, stir for half an hour, (30 minutes,) then warm to a temperature of from fifty to sixty degrees centigrade, (50°-60° C.,) filter off the coloring-matter, wash with a dilute solution of common salt, press, and dry.

Example 3: Diazotize two hundred and thirty-one (231) parts of crystallized sodium sulfanilate in the usual manner and allow the solution to run at ordinary temperature into a solution of two hundred and five (205) parts of the disodium salt of 1.3-dihydroxy-quinolin, to which also sufficient sodium carbonate has been added to maintain the whole alkaline, stir for from three to four (3-4) hours at ordinary temperature, filter off the coloring-matter, wash with a dilute solution of common salt, press, and dry.

Example 4: Diazotize three hundred and fifty-seven (357) parts of amidoazo-benzene-disulfo-acid in the usual manner and allow the solution to run at ordinary temperature into a solution of two hundred and five (205) parts of the disodium salt of 1.3-dihydroxy-quinolin, to which also sufficient sodium carbonate has been added to maintain the whole alkaline, stir for half an hour, (30 minutes,) then warm to a temperature of from fifty to sixty degrees centigrade, (50°-60°,) filter off the coloring-matter, wash with a dilute solution of common salt, press, and dry.

Now what I claim is—

1. As new articles of manufacture the azo coloring-matters which can be obtained by combining a diazo compound with 1.3-dihydroxy-quinolin, which dye unmordanted wool from yellow to orange-red shades, which in the form of their lakes possess from yellow to orange-red shades and which upon reduction with tin and hydrochloric acid yield amido-dihydroxy-quinolin.

2. As a new article of manufacture the azo coloring-matter which can be obtained by combining diazotized sulfanilic acid with 1.3-dihydroxy-quinolin, which dyes unmordanted wool yellow shades, which in the form of its lakes possesses yellow shades and which upon reduction with tin and hydrochloric acid yields sulfanilic acid and amido-dihydroxy-quinolin.

In testimony whereof I have hereunto set my hand in the presence of two subscribing witnesses.

ERNST FUSSENEGGER.

Witnesses:
   J. ALEC. LLOYD,
   JOS. H. LEUTE.